(12) United States Patent
Gallo et al.

(10) Patent No.: US 8,936,406 B2
(45) Date of Patent: Jan. 20, 2015

(54) CAMERA READING APPARATUS WITH DOCUMENT ALIGNMENT GUIDE

(75) Inventors: Stephen Paul Gallo, Auburn, CA (US); Edward Anthony Oliver, Folsom, CA (US)

(73) Assignee: Intel-GE Care Innovations LLC, Roseville, CA (US)

( * ) Notice: Subject to any disclaimer, the term of this patent is extended or adjusted under 35 U.S.C. 154(b) by 93 days.

(21) Appl. No.: 13/420,211

(22) Filed: Mar. 14, 2012

(65) Prior Publication Data

US 2013/0243415 A1    Sep. 19, 2013

(51) Int. Cl.
*G03B 17/00* (2006.01)

(52) U.S. Cl.
USPC ........................................................ 396/419

(58) Field of Classification Search
CPC ..................................................... F16M 13/00
USPC ............... 396/419; 248/123.2; 353/63; 349/6
See application file for complete search history.

(56) References Cited

U.S. PATENT DOCUMENTS

| | | | | |
|---|---|---|---|---|
| 4,736,525 A * | 4/1988 | Deason | ............................ | 33/474 |
| 5,345,986 A * | 9/1994 | Kieffer | ........................... | 144/372 |
| 5,774,237 A * | 6/1998 | Nako | ............................ | 358/471 |
| 6,176,281 B1 * | 1/2001 | Newman | .................. | 144/144.51 |
| D442,873 S * | 5/2001 | Koennecke et al. | ......... | D10/103 |
| 6,550,922 B2 * | 4/2003 | Bogomolnyi | ................. | 353/122 |
| 7,050,715 B1 * | 5/2006 | Carrington et al. | ........... | 396/182 |
| 7,708,238 B2 * | 5/2010 | Sukenari et al. | ........... | 248/123.2 |
| 7,845,807 B2 * | 12/2010 | Iwasaki | .......................... | 353/94 |
| 2007/0007422 A1 * | 1/2007 | Rha | ............................ | 248/447.1 |
| 2009/0097079 A1 * | 4/2009 | Hama et al. | ................... | 358/488 |
| 2009/0298586 A1 * | 12/2009 | Ackley et al. | ................... | 463/31 |
| 2010/0182397 A1 * | 7/2010 | Choi et al. | ...................... | 348/36 |
| 2011/0286052 A1 * | 11/2011 | Takabatake | ................... | 358/475 |

OTHER PUBLICATIONS

Web page, http://www.collegecameras.co.uk/kaiser-rs1-camera-stand.

\* cited by examiner

*Primary Examiner* — Clayton Laballe
*Assistant Examiner* — Linda B Smith
(74) *Attorney, Agent, or Firm* — Pillsbury Winthrop Shaw Pittman LLP

(57) ABSTRACT

A camera reading apparatus having an alignment guide is presented. The alignment guide may have a rigid platform having a substantially flat bottom surface, a substantially flat top surface that is parallel to the bottom surface, and an aperture through the top surface and the bottom surface. The bottom surface may have a first portion and may have a second portion that forms a ledge projecting from the first portion. The first portion may have a front edge, and the second portion may have a side edge. The front edge and the side edge may intersect to form a right angle.

17 Claims, 5 Drawing Sheets

CAMERA READING APPARATUS WITH DOCUMENT ALIGNMENT GUIDE

TECHNICAL FIELD

Embodiments generally relate to a camera reading apparatus, and more particularly to a document alignment guide.

BACKGROUND

Known camera reading apparatuses may capture an image of a document to store or process. Current vendors of camera reading apparatuses provide a mat that marks a location of where a user should place a document so that it is properly positioned relative to the camera reading apparatus. However, placing documents on the marked location may be tedious or may be difficult for those lacking adequate motor skills or having poor eyesight. Further, even if the user is able to properly position a document on the marked location, the document may be easily bumped into an incorrect position.

SUMMARY OF THE INVENTION

One aspect of this invention relates to providing a camera reading apparatus that has an alignment guide. The alignment guide may have a substantially rigid platform that has a substantially flat bottom surface. The bottom surface may have a first portion and may have a second portion that that forms a ledge projecting from the first portion. The first portion may have a front edge that intersects with a side edge of the second portion. The two edges may intersect to form a right angle. The rigid platform of the alignment guide may have an aperture that is shaped to receive and fit around a camera base. A document may thus be aligned against the front edge and the side edge of the alignment guide.

In some embodiments, the first portion may have a back edge, and a part of the back edge may form a curve that protrudes toward the front edge.

In some embodiments, the aperture may have an elliptical shape. In some embodiments, a major axis of the aperture may be 5 inches or greater, and a minor axis of the aperture may be 4 inches or greater. In some embodiments, the aperture of the alignment guide may be positioned such that when camera base and a camera coupled to the base is received by the aperture, a portion of the alignment guide may be in the camera's field of view. For example, the aperture may be positioned at a distance (e.g., 0.5 inches) from the front edge of the first portion such that the front edge may be visible in the camera's field of view when it is coupled to the alignment guide through the camera base.

In some embodiments, the rigid platform may be made from a thermoplastic material, such as plexiglass®.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

One aspect of this invention is directed toward an apparatus for aligning documents that are to be captured by a camera reading apparatus. The document that is captured may have printed text, symbols, drawings, or any combination thereof. A captured image of the document may be stored or processed. Processing the captured image may include performing optical character recognition (OCR) on the image. In some implementations, text or other symbols on the document that are recognized through OCR may be enlarged for a user or read aloud to a user.

Figure 1:
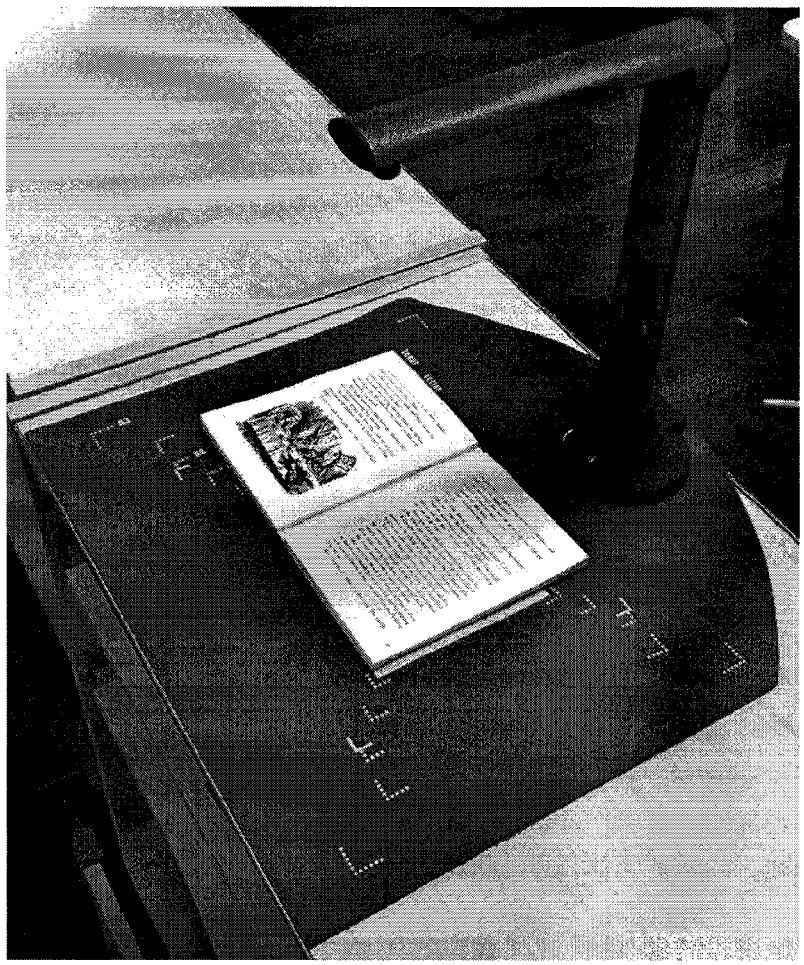
FIG. 1 illustrates a camera reading apparatus on a mat on which a document may be placed in the camera's field of view.

FIG. 1 illustrates a known camera reading apparatus in which a document is placed on a flat surface beneath a camera of the camera reading apparatus. A user may have to manually position the camera and document so the document is properly positioned within the camera's field of view. Inadvertent movement of either the document or the camera may misalign the document relative to the camera's field of view and require a user to reposition the document.

Figure 2A:
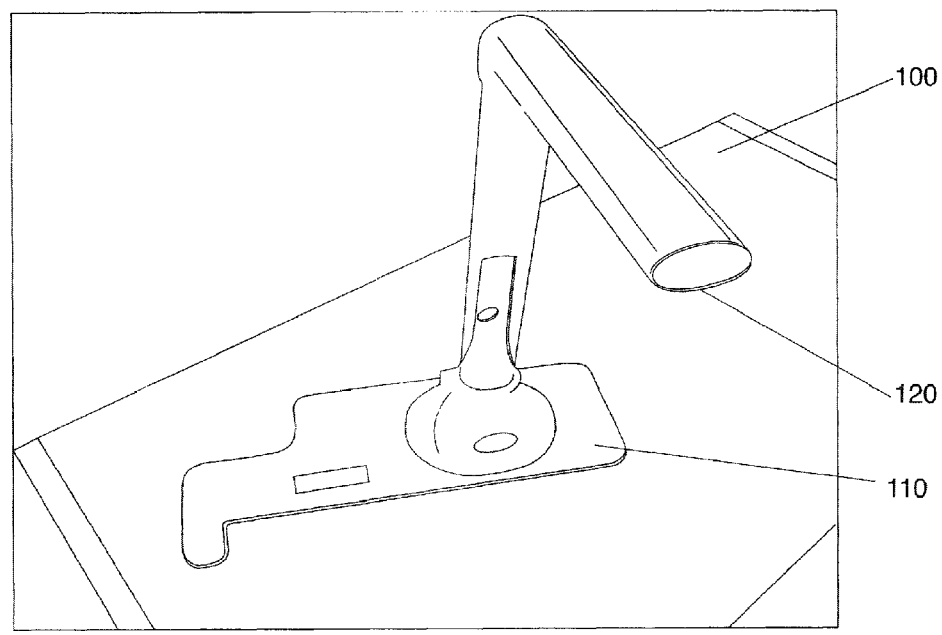
FIGS. 2A-2C illustrate an example embodiment of a camera reading apparatus that has a document alignment guide.
Figure 2B:
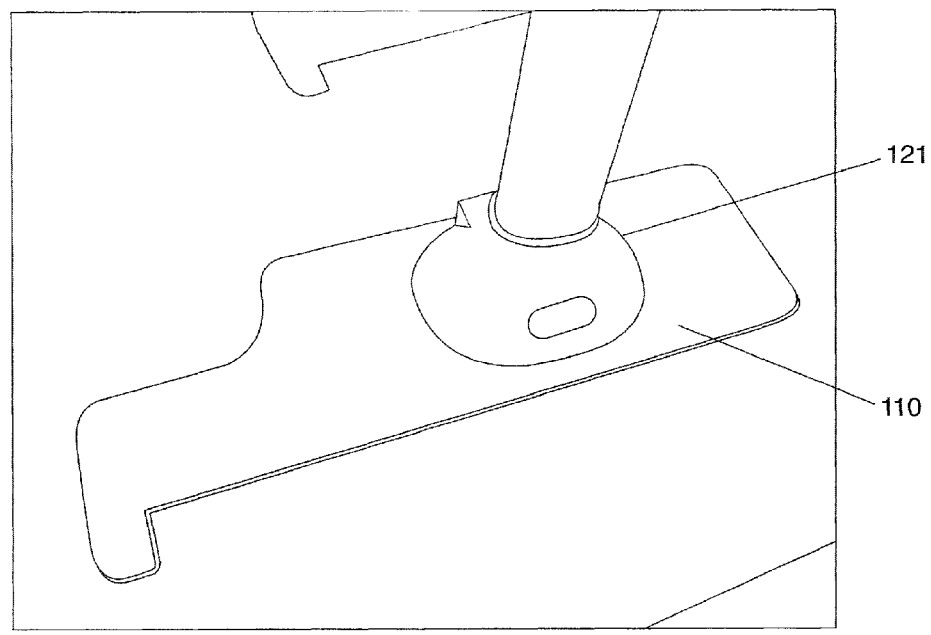

An embodiment of a camera reading apparatus 100 that simplifies positioning of the document is illustrated in FIGS. 2A-2D. Camera reading apparatus 100 may include a camera unit 120, which may have a camera configured to capture one or more document images. Camera unit 120 may be coupled to alignment guide 110, which may provide a platform that forms part of a camera stand for camera unit 120. More specifically, as illustrated in FIG. 2B, a camera base 121 of the camera unit 120 may be coupled to alignment guide 110. The camera base 121 may provide a structure that raises the camera of camera unit 120 above a document to be captured, while the platform of alignment guide 110 may provide additional stability to camera reading apparatus 100.

Figure 2C:
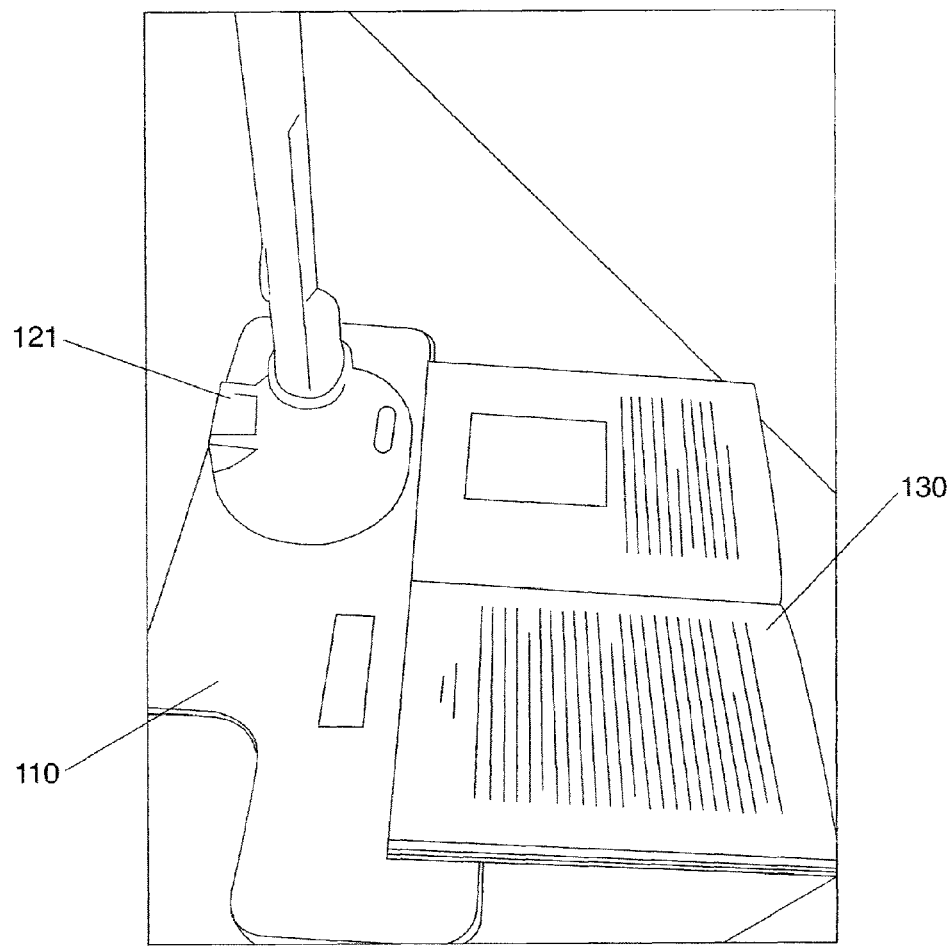

As illustrated in FIG. 2C, alignment guide 110 may simplify placement of a document 130 to be captured by camera unit 120. For example, alignment guide 110 may provide a front edge that may correspond to a top portion of camera unit's 120 field of view and provides a side edge that may correspond to a left portion of camera unit's 120 field of view. To align document 130 with the top and left portions of the camera unit's field of view, a user may push document 130 against the front and side edges, respectively. The user may thus properly align a document even if the user has poor motor skills or poor eyesight. In some implementations, alignment guide 110 has sufficient thickness such that the front and side edges are raised and a document can be pushed up against the edges. The raised edges thus allow a user to align document 130 with the edges without having to look to check the alignment.

Figure 3A:
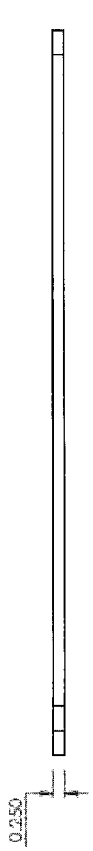
FIGS. 3A-3D illustrate an example embodiment of a document alignment guide.
Figure 3B:
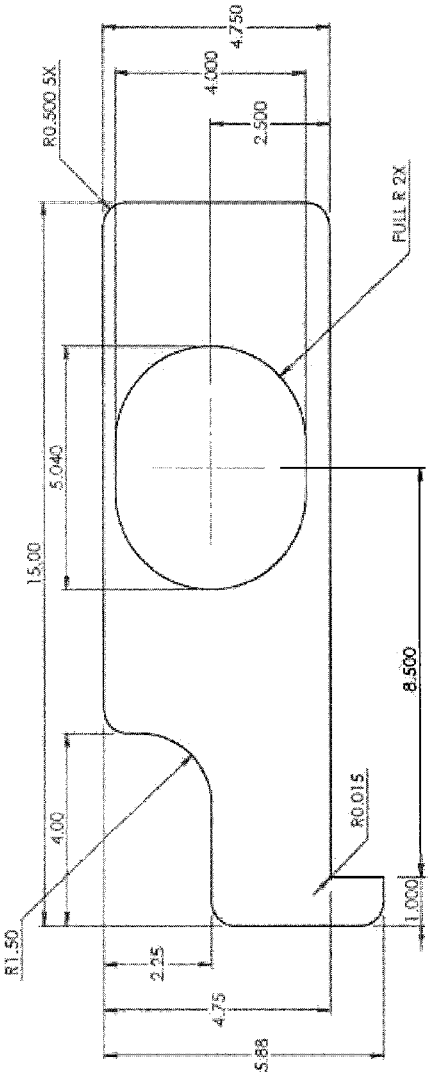
Figure 3C:
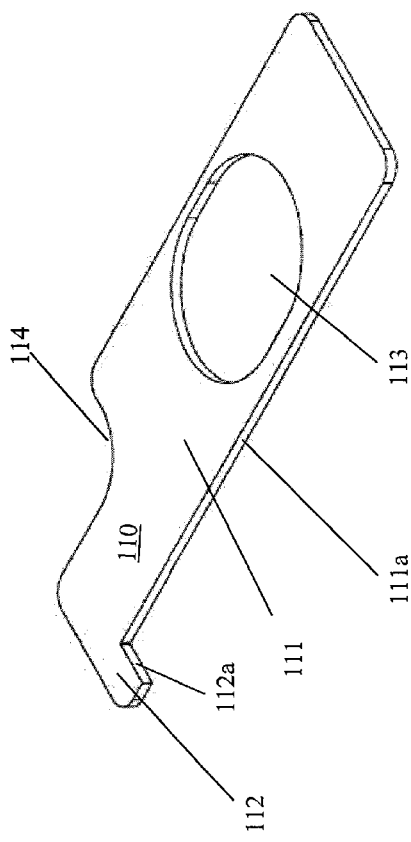
Figure 3D:
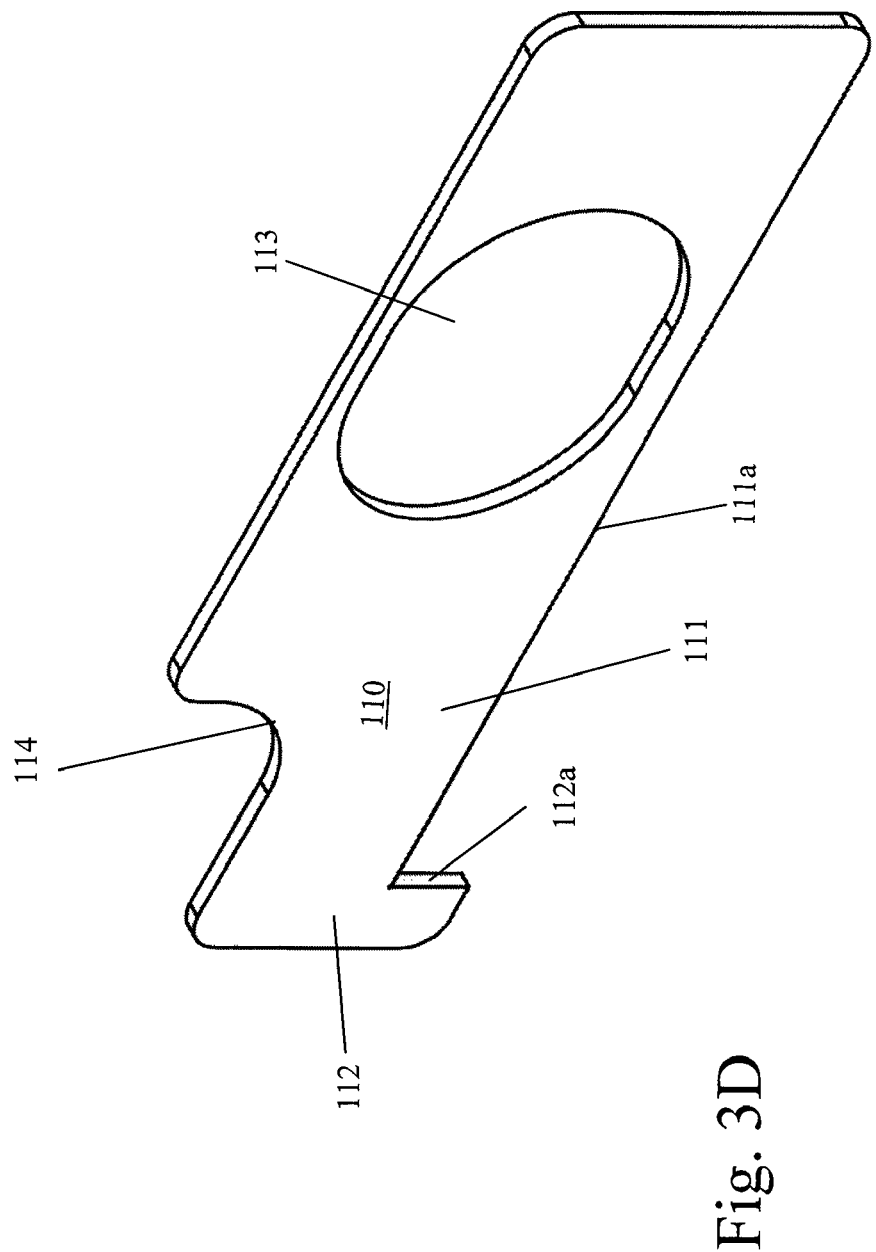

An embodiment of alignment guide 110 is illustrated in more detail in FIGS. 3A-3C. As illustrated in FIG. 3C, alignment guide 110 may be in the form of a platform, such as a flat layer of rigid or substantially rigid material. The platform may have a first portion 111 with a front edge 111a against which a document may be pushed. The platform may have a second portion 112 with a side edge 112a against which the document may be pushed. Second portion 112 may form a ledge that projects from first portion 111. In an embodiment, first portion 111 and second portion 112 may form an L shape, and the front edge 111a and side edge 112a may intersect to form a right angle.

The platform may have an aperture 113 used to couple alignment guide 110 to camera unit 120. The aperture 113 may, for example, have a shape and size that is substantially the same as a bottom of camera base 121, and may fit around the bottom of camera base 121. In an embodiment, aperture 113 may have a shape that is elliptical, circular, rectangular, square, triangular, or any other shape.

The platform of alignment guide 110 may have a back edge 114. In an embodiment, a first part of back edge 114 may be straight, while a second part of back edge 114 may curve inward, and may protrude toward front edge 111a. As illustrated in FIG. 3B, the curve may be substantially circular.

Example dimensions of alignment guide 110 are illustrated in FIGS. 3A and 3B. In an embodiment, alignment guide may have a thickness of at least 0.25 inches, at least 0.5 inches, at least 0.75 inches, or any other thickness. In an embodiment, front edge 111a of the alignment guide may have a length that is at least 8.5 inches, at least 11 inches, or at least 15 inches, or any other length. In an embodiment, side edge 112a may have a length that is at least 1.13 inches, at least 2 inches, or at least 4 inches. In an embodiment, if back edge 114 curves in a circular manner, the curve may have a radius of at least 1.5 inches, at least 2 inches, at least 2.5 inches, or any other radius dimension. In an embodiment, if aperture 113 has an elliptical shape, it may have a major axis that is at least 5 inches, such as 5.040 inches, at least 5.5 inches, or at least 6 inches. It may further have a minor axis that is at least 4 inches or at least 4.5 inches. In an embodiment, the aperture 113 may be positioned at most 0.75 inches from front edge 111a. For example, aperture 113 may be positioned 0.5 inches or 0.25 inches from front edge 111a. In an embodiment, the aperture may be positioned at a distance from front edge 111a such that a portion of alignment guide 110 near front edge 111a is in a field of view of a camera of camera unit 120. In an embodiment, a width of alignment guide 110 may be at least 4.75 inches. In another embodiment, the width may be greater (e.g., 6 inches), and may thus provide greater stability to the camera reading apparatus 100 and reduce a risk of apparatus 100 tipping over.

The second portion 112 that forms a ledge projecting from first portion 111 may be on a left side or right side of the first portion 111. In some implementations, alignment guide may have second and third portions that each form a ledge projecting from opposite sides (e.g., left side and right side) of the first portion.

In some implementations, a bottom surface of alignment guide 110 may be covered with a non-sliding material such as rubber or Velcro®.

In some implementations, alignment guide 110 may be made of plastic, metal, wood, or any other material. In one example, the alignment guide may be made of a thermoplastic material such as plexiglass®. The material may have, for example, a frosted finish.

Example sizes/models/values/ranges may have been given, although embodiments of the present invention are not limited to the same. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. An alignment guide, comprising:
   a platform having a substantially flat bottom surface, a top surface, and an aperture through the top surface and the bottom surface,
   wherein the bottom surface has a first portion and has a second portion that forms a ledge projecting from the first portion,
   wherein the first portion has a front edge and the second portion has a side edge, the front edge of the first portion and the side edge of the second portion intersecting to form a right angle,
   wherein the aperture is used to couple the alignment guide to a camera unit.

2. The alignment guide of claim 1, wherein the first portion has a back edge, and wherein a part of the back edge forms a curve that protrudes toward the front edge.

3. The alignment guide of claim 2, wherein the top surface is flat and is substantially parallel to the top surface.

4. The alignment guide of claim 3, wherein the platform has a thickness that is 0.5 inches or less.

5. The alignment guide of claim 3, wherein the aperture is substantially elliptical in shape.

6. The alignment guide of claim 3, wherein the platform is made from a thermoplastic material.

7. The alignment guide of claim 5, wherein the aperture has a major axis that is 5 inches or greater.

8. The alignment guide of claim 7, wherein the aperture has a minor axis that is 4 inches or greater.

9. A camera reading apparatus, comprising:
   a camera base adapted to support a camera;
   an alignment guide coupled to the camera base, the alignment guide comprising:
   a platform having a substantially flat bottom surface, a substantially flat top surface that is parallel to the bottom surface, and an aperture through the top surface and the bottom surface,
   wherein the bottom surface has a first portion and has a second portion that forms a ledge projecting from the first portion,
   wherein the first portion has a front edge and the second portion has a side edge, the front edge of the first portion and the side edge of the second portion intersecting to form a right angle, and
   wherein the aperture fits around a bottom of the camera base.

10. The camera reading apparatus of claim 9, further comprising a camera supported by the camera base, wherein a lens of the camera points toward the camera base.

11. The camera reading apparatus of claim 10, wherein the first portion of the rigid platform has a back edge, and wherein a part of the back edge forms a curve that protrudes toward the front edge.

12. The camera reading apparatus of claim 11, wherein the rigid platform has a thickness that is 0.5 inches or less.

13. The camera reading apparatus of claim 11, wherein the aperture is substantially elliptical in shape.

14. The camera reading apparatus of claim 11, wherein the front edge of the first portion of the platform has a length that is 8.5 inches or greater.

15. The camera reading apparatus of claim 11, wherein the platform is made from a thermoplastic material.

16. The camera reading apparatus of claim 13, wherein the aperture has a major axis that is 5 inches or greater.

17. The camera reading apparatus of claim 16, wherein the aperture has a minor axis that is 4 inches or greater.

* * * * *